(12) United States Patent
Blohm

(10) Patent No.: US 8,187,388 B2
(45) Date of Patent: May 29, 2012

(54) METHOD FOR TREATING CATALYSTS

(75) Inventor: Maik Blohm, Oldenburg (DE)

(73) Assignee: STEAG Energy Services GmbH, Essen (DE)

( * ) Notice: Subject to any disclaimer, the term of this patent is extended or adjusted under 35 U.S.C. 154(b) by 840 days.

(21) Appl. No.: 11/794,743

(22) PCT Filed: Jan. 4, 2006

(86) PCT No.: PCT/EP2006/000022
§ 371 (c)(1),
(2), (4) Date: Jul. 5, 2007

(87) PCT Pub. No.: WO2006/072569
PCT Pub. Date: Jul. 13, 2006

(65) Prior Publication Data
US 2008/0115800 A1    May 22, 2008

(30) Foreign Application Priority Data

Jan. 5, 2005    (DE) .......................... 10 2005 000 873

(51) Int. Cl.
*B08B 9/032*    (2006.01)
(52) U.S. Cl. ........................ 134/22.12; 134/1; 134/22.18
(58) Field of Classification Search ............. 134/1, 22.1, 134/22.11, 22.12, 22.18, 34, 42
See application file for complete search history.

(56) References Cited

U.S. PATENT DOCUMENTS

| | | | |
|---|---|---|---|
| 4,615,991 A | 10/1986 | Obayashi et al. | 502/28 |
| 4,656,147 A | 4/1987 | Iida et al. | 502/26 |
| 5,151,256 A | 9/1992 | Kato et al. | 423/210 |
| 5,186,758 A * | 2/1993 | Hartman | 134/10 |
| 5,283,052 A | 2/1994 | Hums | 422/223 |
| 5,820,693 A | 10/1998 | Patchett et al. | 134/22.12 |
| 5,869,419 A | 2/1999 | Obayashi et al. | 502/305 |
| 5,873,329 A | 2/1999 | Heering et al. | 122/7 R |
| 5,882,422 A | 3/1999 | Obayashi et al. | 134/1 |
| 6,025,292 A | 2/2000 | Obayashi et al. | 502/27 |
| 6,232,254 B1 | 5/2001 | Schneider et al. | 502/22 |
| 6,241,826 B1 | 6/2001 | Dittmer et al. | 134/1 |

(Continued)

FOREIGN PATENT DOCUMENTS

DE    38 10 137 A1    10/1989

(Continued)

OTHER PUBLICATIONS

Emissions Control, *SCR Maintenance Fundamentals*, Ken Wicker and Jim Staudt, POWER, Jun. 2004, pp. 52-57.

(Continued)

*Primary Examiner* — Michael Kornakov
*Assistant Examiner* — Ryan Coleman
(74) *Attorney, Agent, or Firm* — K&L Gates LLP

(57) ABSTRACT

A method for treating catalysts, in particular, for the cleaning and/or regeneration of a catalyst, whereby the catalyst comprises parallel channels. The catalyst is taken out of service for treatment and flushed with a cleaning and/or regeneration fluid in-situ in the assembled state. The cleaning and/or regeneration fluid is introduced under pressure to that end of a bundle of adjacent channels away from the pressurized end of the catalyst. The channels of the bundle are flushed against gravity and the cleaning and/or regeneration fluid escapes from the other end of the channels thereupon enters the free ends of other adjacent channels and flows through the same under the effect of gravity.

21 Claims, 1 Drawing Sheet

U.S. PATENT DOCUMENTS

| | | | |
|---|---|---|---|
| 6,354,310 B1 * | 3/2002 | Farr et al. | 134/56 R |
| 6,387,836 B1 | 5/2002 | Dörr et al. | 502/22 |
| 6,395,665 B2 | 5/2002 | Nojima et al. | 502/25 |
| 6,455,456 B1 | 9/2002 | Spokoyny | 502/20 |
| 6,482,762 B1 | 11/2002 | Ruffin et al. | 502/33 |
| 6,484,733 B2 | 11/2002 | Budin et al. | 134/22.19 |
| 6,596,661 B2 | 7/2003 | Neufert | 502/28 |
| 6,631,727 B2 | 10/2003 | Schneider et al. | 134/110 |
| 6,913,026 B2 | 7/2005 | Winnestaffer et al. | 134/22.18 |
| 6,929,701 B1 | 8/2005 | Patel et al. | 134/1 |
| 2002/0006860 A1 | 1/2002 | Schneider et al. | 502/22 |
| 2004/0163676 A1 | 8/2004 | Winnestaffer et al. | 134/17 |
| 2005/0119109 A1 | 6/2005 | Schneider et al. | 502/22 |
| 2006/0060219 A1 | 3/2006 | Rabitsch et al. | 134/22.11 |
| 2006/0094587 A1 | 5/2006 | Lee et al. | 502/27 |
| 2006/0135347 A1 | 6/2006 | Schluttig et al. | 502/25 |
| 2006/0148639 A1 | 7/2006 | Foerster | 502/27 |

FOREIGN PATENT DOCUMENTS

| | | |
|---|---|---|
| DE | 38 16 600 A1 | 11/1989 |
| DE | 43 00 933 C1 | 5/1994 |
| DE | 195 33 912 A1 | 3/1997 |
| DE | 196 28 212 A1 | 1/1998 |
| DE | 198 29 916 A1 | 1/2000 |
| DE | 102 18 380 A1 | 11/2003 |
| DE | 102 22 915 A1 | 1/2004 |
| DE | 102 41 004 A1 | 3/2004 |
| DE | 102 42 081 A1 | 3/2004 |
| DE | 103 25 779 A1 | 1/2005 |
| EP | 0 335 240 A2 | 3/1989 |
| EP | 0 353 467 A1 | 2/1990 |
| EP | 0 677 320 | 10/1995 |
| EP | 0 763 589 B1 | 3/1997 |
| EP | 0 824 973 A2 | 2/1998 |
| EP | 0 910 472 B1 | 4/1999 |
| EP | 19990936166 | 7/1999 |
| JP | 58 30345 | 2/1983 |
| WO | WO 95/20434 | 8/1995 |
| WO | WO 98/02248 | 1/1998 |
| WO | WO 00/01483 | 1/2000 |
| WO | WO 00/01211 | 3/2000 |
| WO | WO 03/099437 A1 | 12/2003 |
| WO | WO 2004/022226 A1 | 3/2004 |
| WO | WO 2004/026447 A1 | 4/2004 |
| WO | WO 2004/073835 A1 | 9/2004 |
| WO | WO 2004/076067 A1 | 9/2004 |

OTHER PUBLICATIONS

U.S. Appl. No. 11/640,475, filed Dec. 15, 2006, Brüggendick et al.

* cited by examiner

METHOD FOR TREATING CATALYSTS

CROSS-REFERENCES TO RELATED APPLICATIONS

This application claims the benefit of German patent application 10 2005 000 873.9, filed Jan. 5, 2005, herein incorporated by reference.

FIELD OF THE INVENTION

The present invention relates to a method for treating catalytic converters. In particular, the present invention relates to a method for cleaning and/or regenerating highly porous ceramic catalytic converters having multiple parallel channels, through which a fluid flows from the direction of a pressure side during the operation of the catalytic converter. For performing the treatment, or cleaning or regeneration, the catalytic converters are taken out of service and are flushed in-situ while remaining in the assembled state with a fluid in that the fluid is directed through the channels of the catalytic converter.

BACKGROUND OF THE INVENTION

Customarily catalytic converters are employed for accelerating or improving chemical reactions. Catalytic converters are employed in particular in industrial combustion systems for cleaning flows of fluids of substances which are being carried along. The catalytic converters have a surface with active centers at which the substances carried along in the fluid flow are either adsorbed and/or absorbed. The adsorbed and/or absorbed substances are subjected to a reaction with other substances contained in the fluid or with reagents specifically added for this purpose to the fluid, and the reaction products are released and are carried along in the fluid flow.

In connection with the use of catalytic converters in combustion systems, flue gas being generated in the course of the combustion is passed by the highly porous ceramic catalytic converters along the surface of the catalytic converters for converting undesired substances into less critical or harmless substances. Catalytic converters are used in particular for converting nitrous oxides present in the flue gas. In so-called selective catalytic reduction methods (SCR), $NO_x$ (nitrous oxides) is reacted with $NH_3$ (ammonia), which is specifically added to the flue gas as a reducing reagent, to form water ($H_2O$) and nitrogen ($N_2$).

The surface of the catalytic converters and the catalytically active centers located thereon must be accessible to the fluid flow (e.g. flue gas) so that the catalytic converter can perform its catalytic effect on the harmful constituents of the fluid. In particular, the access paths to the surface must be free, and the surface free of blocking and/or blinding layers and catalytic poisons, which over time collect there in the course of operation. Otherwise the catalytic converters lose a portion of their catalytic activity because of chemical reactions of catalytic poisons with constituents of the flue gas rendering the catalytically active sites on the catalyst's surface catalytically inactive, plugged and/or clogged pores in the catalytic converter, and blocking and/or blinding layers, as well as plugged and/or clogged channels.

Methods for treating SCR catalytic converters with cleaning agents are known from PCT Patent Publication WO 00/001483 or PCT Patent Publication WO 04/073835. However, for this purpose it is necessary to disassemble the catalytic converters from their assembled, operationally ready state, and to transport, treat, again transport and reassemble them.

U.S. Pat. No. 6,631,727 describes a method wherein catalytic converters (blocks of catalytic converters) can be treated in the installed state in that a cleaning agent is conducted from above through the conduits and collected at the other side of the channels. On the one hand, not all the dirt is loosened during this one-sided flushing, on the other hand the method is elaborate/cumbersome, since it is necessary to provide work areas on both sides of the blocks of catalytic converters, where material and equipment for introducing and/or collecting the fluid must be made available.

It is the object of the present invention to provide a method which permits a simple, efficient and cost-effective cleaning and/or regeneration of catalytic converters.

SUMMARY OF THE INVENTION

In accordance with the present invention, a method is provided for treating catalytic converters having one or several parallel channels, through which a flow occurs from the pressure side in the course of their operation, and for when the catalytic converters are taken out of service for treatment and, in the assembled and installed state, are flushed in-situ with a cleaning and/or regeneration fluid by the fluid being directed through the channels. In accordance with the present invention, the fluid is introduced under pressure at the end of bundles of adjacent channels which faces away from the pressure side (bottom), so that the flow through the channels of the bundle takes place upwards against the action of gravity and the fluid exits from the ends of the channels of the bundle facing the pressure side (top), enters the ends of other adjacent channels there and flows back downwards through these other channels by the action of gravity.

A fluid is introduced under pressure into a bundle of adjoining channels of a catalytic converter which has been taken out of service, but remains in the assembled state. In this case the fluid is introduced into the side of the catalytic converter facing away from the pressure side, i.e. the side at which the fluid to be treated (flue gas) exits during the operation of the catalytic converter. This side is typically located physically lower in the fluid flow than the pressure side, i.e. the fluid flow flows through the catalytic converter from the pressure side downwards in the direction in which gravity acts.

The fluid, which is introduced under pressure in the course of the treatment, flows through the channels of the bundle opposite to gravity and emerges from the channels of the bundle at the pressure side of the catalytic converter (at the top). There, the fluid enters other adjacent channels (namely those channels which are not blocked by treatment fluid flowing upward through them) and, by the action of gravity, flows through these adjacent channels in the direction (downward) which the fluid to be treated (for example flue gas) also takes during the operation of the catalytic converter.

The method in accordance with the present invention has the advantage that it can be performed on catalytic converters without requiring their removal from their normal location of operation and/or disassembly, which saves expenses in regard to downtimes and personnel. For performing the method, material, equipment, and/or apparatus need only be made available at the underside of the catalytic converter, because the fluid is introduced under pressure at this side and also exits at the same side again by the action of gravity. The fluid is introduced, and collected if required, at the same side.

Moreover, the method in accordance with the present invention makes particularly effective cleaning possible, because the initial flow of the cleaning and/or regeneration fluid through the channels takes place opposite the operating flow direction. Pluggage, clogs and dirt can be more easily removed because of this "reverse flushing" of the channels.

In accordance with the present invention, a flow takes place sequentially through different channels, each constituting a bundle of channels, so that each channel is flushed sequentially in both directions. The channel is flushed under pressure from the side opposite the pressure side, provided it is a part of the just selected bundle of channels, and subsequently a flow by the action of gravity takes place from the direction of the pressure side downward as soon as it is no longer a member of the just selected bundle of channels and instead adjacent to it. A flow can take place through all channels in two different flushing directions in this way.

The method can be applied to catalytic converters of any design and type (e.g. honeycomb, plate, corrugated, etc.), the only restriction is the requirement for channels through which a flow can take place. The cross section in particular of the channels can be of any arbitrary geometry, for example, square, rectangular, triangular, partially rounded or irregular. Not all of the channels are required to have identical cross sections. Accordingly, channel-type catalytic converters of modular construction or honeycomb, plate, corrugated, etc. catalytic converters can also be treated.

The fluid is preferably introduced into the channels with the aid of a filling element, wherein the filling element is attached to the channel ends facing away from the pressure side in such a way that the treatment fluid is sealed against the outside thus forcing it through the intended channels.

An appropriate filling element can be designed in many different ways for enabling the sealing function for the treatment fluid to a channel bundle. It is possible to employ a filling element which is matched to the dimensions of the channels and to shift it at chronological intervals by multiples of a channel dimension, so that a flow under pressure takes place though a different channel bundle each time. However, a universal filling element, whose seal is wider than the maximum dimension of a single channel, can also be used just the same, so that no pressure loss occurs because of partially sealed channel ends. In this case, each channel whose opening area is only partially charged with pressure has been covered by a seal in the remaining opening area.

It is advantageous if fluid flowing out of the ends of the channels facing away from the pressure side (typically downward) is collected and drawn away. In this case it is particularly advantageous if the outflowing fluid is collected with the aid of a collecting device surrounding the filling element.

The filling element and the collecting device can be coupled or combined, so that the use of an appropriate device and the execution of the method in accordance with the present invention can be particularly easy to perform because the filling element and the collecting device can be shifted together from channel bundle to channel bundle and the filling element and the collecting device are aligned with each other at all times. Coupling can be designed to be adjustable, so that the alignment of the filling element and the collecting device in relation to each other is variable. If, for example, the filling element and the collecting device each have a rectangular opening area, the filling element can be arranged centered in respect to the collecting device in the case of treating central channel bundles. When treating channel bundles in the edge areas of the catalytic converters or along the perimeter, the filling element can be shifted in relation to the collecting device, for example it can be arranged near the edge areas of the collecting device. Also, the filling and the collecting devices can possibly be combined into one device fulfilling both purposes at the same time.

It is particularly advantageous if the collected fluid is used again for flushing the channels. In this way, the method in accordance with the present invention can be particularly well applied under the aspects of environmental friendliness. The fluid is preferably supplied to an ion exchanger after collection and prior to being used again and/or a distillation step is performed.

A cleaning and/or regeneration agent can be added to the fluid which is introduced under pressure into a bundle of channels for improving the cleaning and/or regeneration effects and increasing the catalytic activity of the catalytic converter, or a gas, an abrasive agent or a catalytically active substance (e.g. oxides of molybdenum, tungsten, vanadium, etc.) can be admixed.

It can be particularly advantageous if, in addition to flushing, ultrasonic or low-frequency vibrations are transmitted with the aid of the filling element.

In the course of being transmitted through the fluid or the material of the catalytic converter, the transmitted sound vibrations additionally contribute to the cleaning and/or regeneration of the channels and dissolve pluggage, clogs and dirt, which are subsequently removed by the cleaning and/or regeneration fluid flow.

Further advantageous embodiments of the method in accordance with the present invention are described herein.

BRIEF DESCRIPTION OF THE DRAWINGS

The present invention will now be described in greater detail by means of the attached drawings.

DETAILED DESCRIPTION OF THE INVENTION

Figure 1:
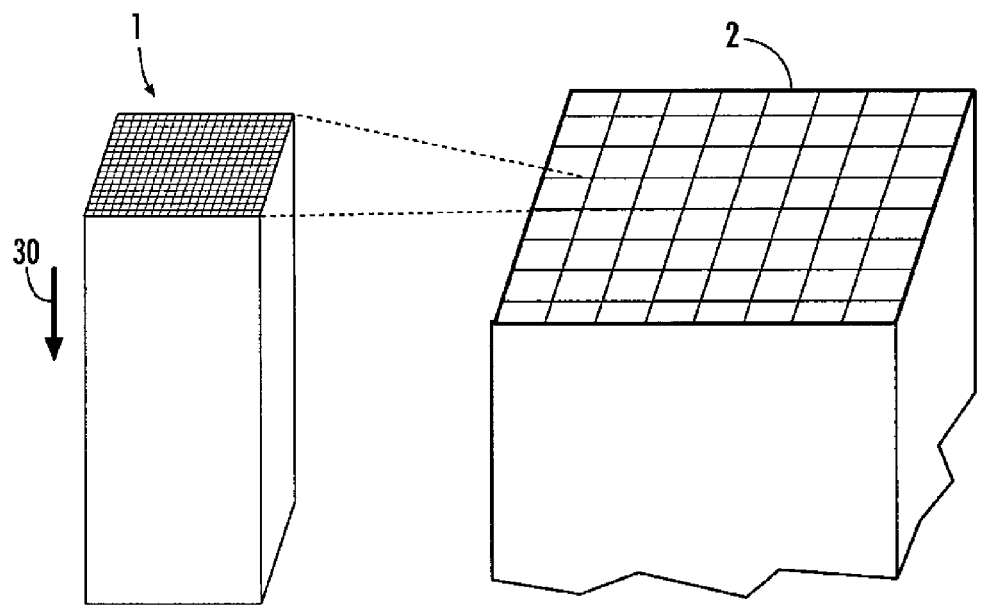
FIG. 1 shows a schematic perspective view of a catalytic converter module having multiple flow channels, as well as a catalytic converter block with one or several catalytic converter modules.

A catalytic converter module 1 is represented in FIG. 1. One or several of such catalytic converter modules 1 in a metal frame 2 is/are mounted in a fluid flow consisting of e.g. flue gases carried away out of e.g. a combustion furnace of a power plant. The flow direction 30 of the flue gases is represented in FIG. 1 and extends in the direction of the action of gravity, i.e. from the top to the bottom.

Figure 2:
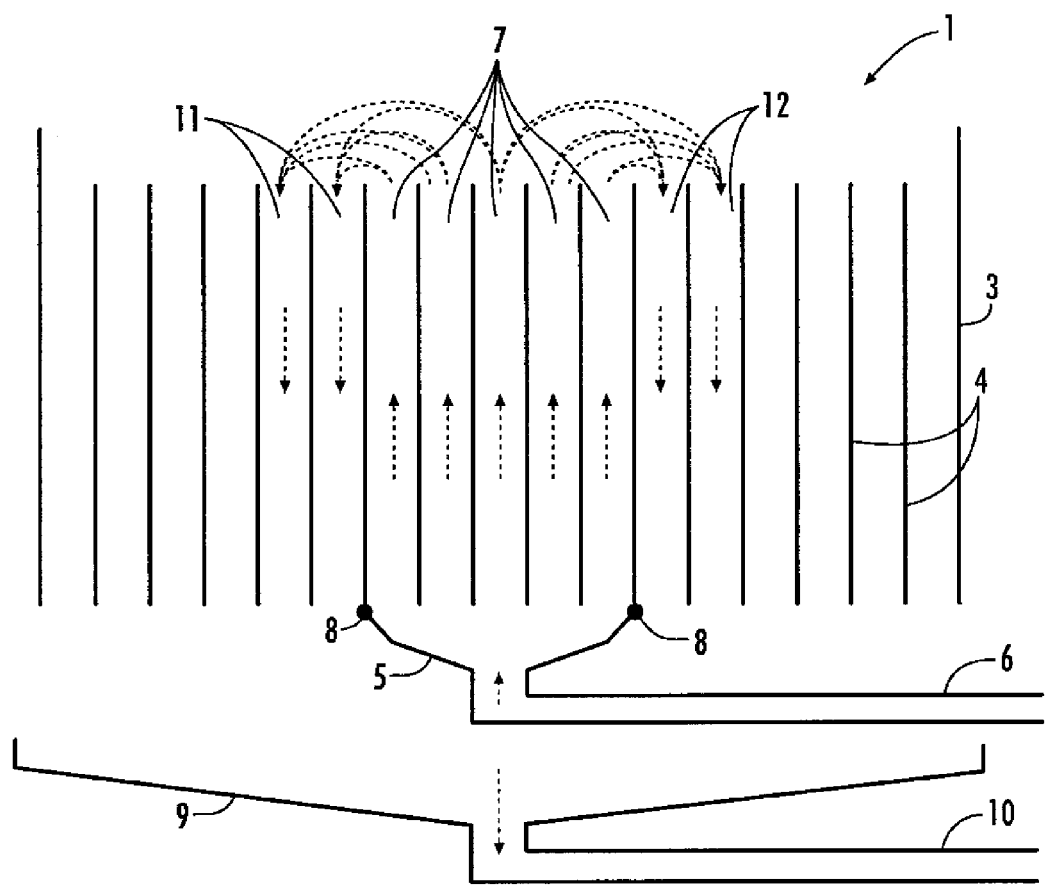
FIG. 2 shows a schematic representation of the execution of the method in accordance with the present invention.

FIG. 2 schematically shows a cross section through a catalytic converter module 1. The exterior walls 3 and a multitude of interior walls 4 constitute flow channels for the flue gas. Since the catalytic converter for the execution of the method in accordance with the present invention has been taken out of service, no flue gas flow exists in the situation represented in FIG. 2. During operation, the side located at the top in the drawing plane of FIG. 2 represents the pressure side for the fluid flow, while the side of the catalytic converter 1 located at the bottom is the side of the catalytic converter facing away from the pressure side. A filling element 5 with a feed line 6 is pressed from below against a bundle of channels 7 in a sealing manner. Seals 8 permit sealing of the cleaning and/or regeneration fluid flowing through the filling element 5 to the walls 3 or 4. A collecting device 9 is arranged underneath the filling element 5, whose bottom tapers toward the center and terminates in a run-off line 10.

A fluid introduced under pressure into the feed line 6 is distributed to the bundle of channels 7 by means of the filling element 5 and is conducted upward against the action of gravity through these channels. The fluid exits at the upper end of the channels 7 and is distributed into surrounding channels 11 and 12 which border the channel bundle 7 or are adjacent to it (represented by dotted arrows). A downward flow caused by the action of gravity takes place in the channels 11 and 12, and the fluid exiting at the bottom gets into the collecting device 9 and is drawn off through the run-off line 10. The drawn-off fluid can be recycled and, under pressure, can again be employed through the feed line 6 for cleaning and/or regeneration of the channels.

In the represented embodiment the filling element 5 with its feed line 6 can be moved independently of the collecting device 9. Because of this it is possible to also flush channels located at the edge and/or along the perimeter from below under pressure, i.e. to employ the filling element 5 decentrally offset from the collecting device 9.

Numerous variations are possible within the framework of the present invention. For example, after having been collected, the fluid can be entirely or partially removed, or also only partially recycled. The catalytic converter can be dried following the treatment. In the course of recycling of the fluid it is possible to remove solids such as e.g. undissolved fly ash particles, rocks or others by means of an additional solids removal arrangement (e.g. hydrocyclone). Mixing installations (for example stirrers) can be provided in a reservoir vessel containing the fluid for flushing the channels, and water, deionized water or prepared cleaning and/or regeneration solutions, as well as liquid and solid auxiliary materials, can be supplied to a fluid circulation. Such auxiliary materials include, but are not limited to, means for setting the pH-value, means for setting the redox potential or for changing the surface tension of the fluid, abrasive solid materials for increasing the cleaning effect, and/or catalytically-active substances. Moreover, heating or cooling devices can also be employed in the process for heating or cooling the cleaning and/or regeneration fluid.

In order to make possible a longer residence time of the fluid in the channels, and therefore an increased contact time of the fluid with the surfaces of the catalytic converter, there is furthermore the possibility of sealing those channels, which are not being flushed under pressure, with fluid. In this case the fluid "lingers" for a while in these channels. It is possible to use for example an additional filling element, which has a draining device with which, when needed, the fluid can be drawn off the channels into the collecting device. The use of a filling element is also possible for specifically filling and emptying a channel. In this case the connection of the elements by means of rigid lines and valves is sensible, so that the elements can be alternatingly used as feed or drain elements.

The invention claimed is:

1. A method for treating a catalytic converter having a pressure side for flow of a flue gas fluid and a bundle of channels with channel ends through which the flue gas fluid flows from the pressure side during operation of the catalytic converter and through which a first fluid for cleaning, regeneration, or a combination thereof is flushed and directed through the channels of the catalytic converter in-situ in an assembled state when the catalytic converter is taken out of service for treatment, the method comprising:
 accessing a side of the catalytic converter in the assembled and installed state, away from the pressure side, wherein the catalytic converter remains installed in its location of operation;
 applying a filling element to the ends of the channels of the bundle of channels facing away from the pressure side, wherein the filling element forms a seal to the ends of the channels of the bundle of channels,
 introducing the first fluid under pressure with aid of the filling element into the bundle of channels,
 directing the first fluid against the action of gravity upward through the bundle of channels,
 wherein the first fluid exits from the ends of the channels of the bundle of channels facing the pressure side,
 wherein the first fluid enters into the ends of the channels of surrounding adjacent channels, and
 wherein the first fluid flows back through the surrounding channels by action of gravity.

2. The method according to claim 1, wherein the first fluid flows out of the ends of the channels facing away from the pressure side, is collected, and is drawn off.

3. The method according to claim 1, wherein the outflowing first fluid is collected with aid of a collecting device surrounding the filling element.

4. The method according to claim 2, wherein the collected first fluid is reused for flushing the channels.

5. The method according to claim 4, wherein prior to being reused, the first fluid is passed through an ion exchanger.

6. The method according to claim 4, wherein prior to being reused, the first fluid is passed through a distillation step.

7. The method according to claim 4, wherein prior to being reused, the first fluid is passed through a solids removal device.

8. The method according to claim 4, wherein the first fluid is heated.

9. The method according to claim 4, wherein the first fluid is cooled.

10. The method according to claim 1, wherein the first fluid is a cleaning solution, a regeneration solution, or a combination thereof.

11. The method according to claim 1, wherein a second fluid is introduced into the channels together with the first fluid, wherein the second fluid is a gas.

12. The method according to claim 1, wherein a catalytically-relevant substance is introduced into the channels with the first fluid.

13. The method according to claim 1, wherein an abrasive agent is introduced into the channels together with the first fluid.

14. The method according to claim 1, wherein ultrasonic vibrations are transmitted into the channels with aid of the filling element.

15. The method according to claim 1, wherein low-frequency vibrations are transmitted into the channels with aid of the filling element.

16. The method according to claim 1, wherein vibrations from one of an ultrasonic vibration source and a low-frequency vibration source are transmitted into the channels with the aid of the filing element.

17. The method of claim 1, wherein the first fluid comprises material for setting the pH value of the first fluid.

18. The method according to claim 1, wherein the first fluid comprises material for setting the redox potential of the first fluid.

19. The method according to claim 1, wherein the first fluid comprises material for setting the surface tension of the first fluid.

20. The method according to claim 1, further comprising drying the catalytic converter.

21. The method according to claim 1, wherein the channels of the bundle are in parallel.

* * * * *